L. H. PERLMAN.
RIM OPERATING TOOL.
APPLICATION FILED DEC. 4, 1916.
1,374,102.
Patented Apr. 5, 1921.
2 SHEETS—SHEET 1.
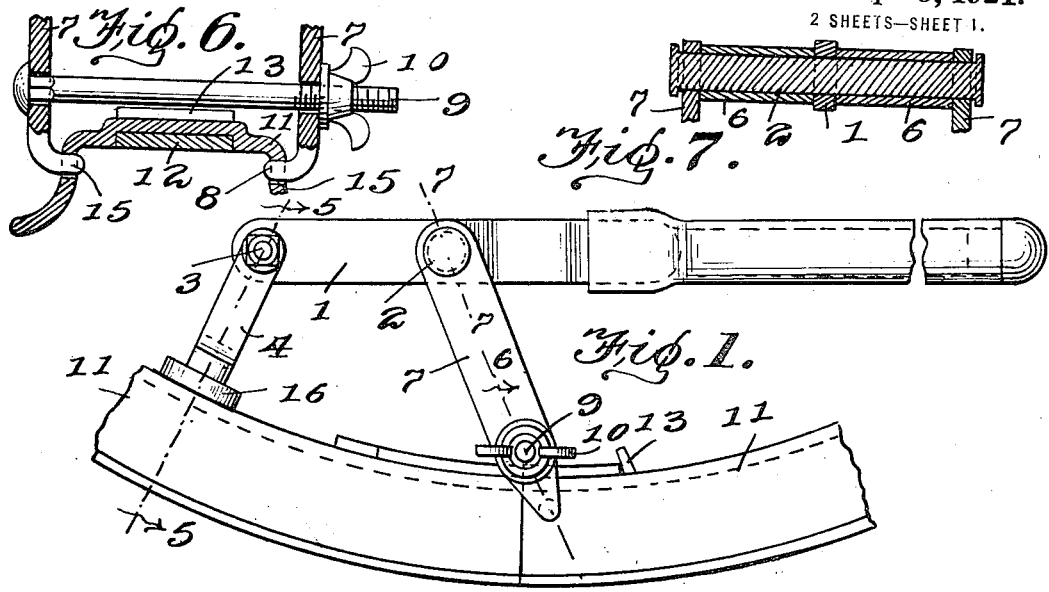
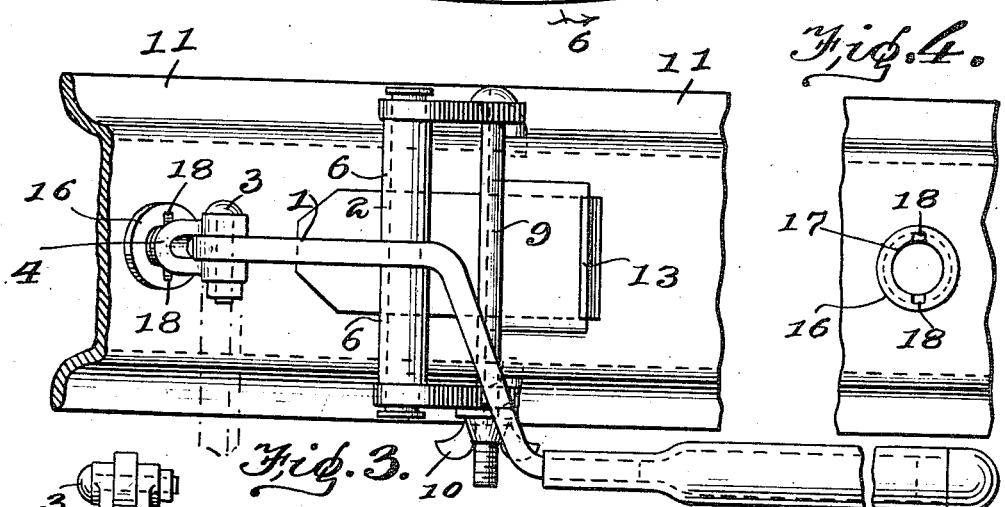
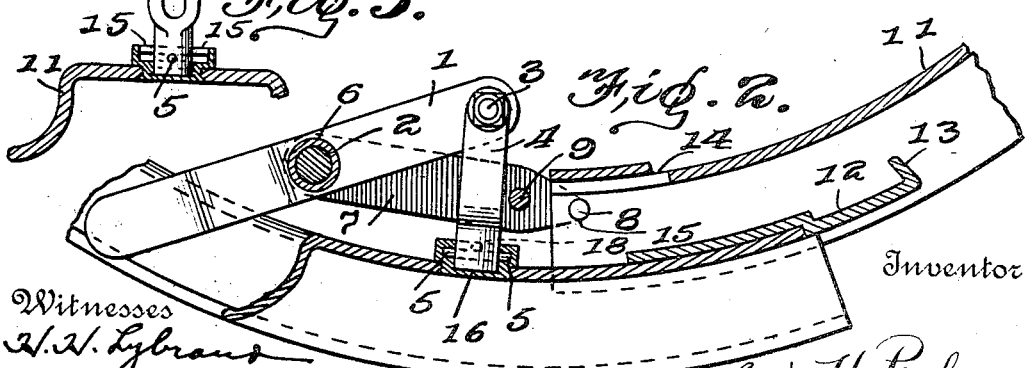
Inventor
Louis H. Perlman,
By Edgar M. Kitchin
his Attorney
Witnesses
H. H. Lybrand
C. H. Fesler

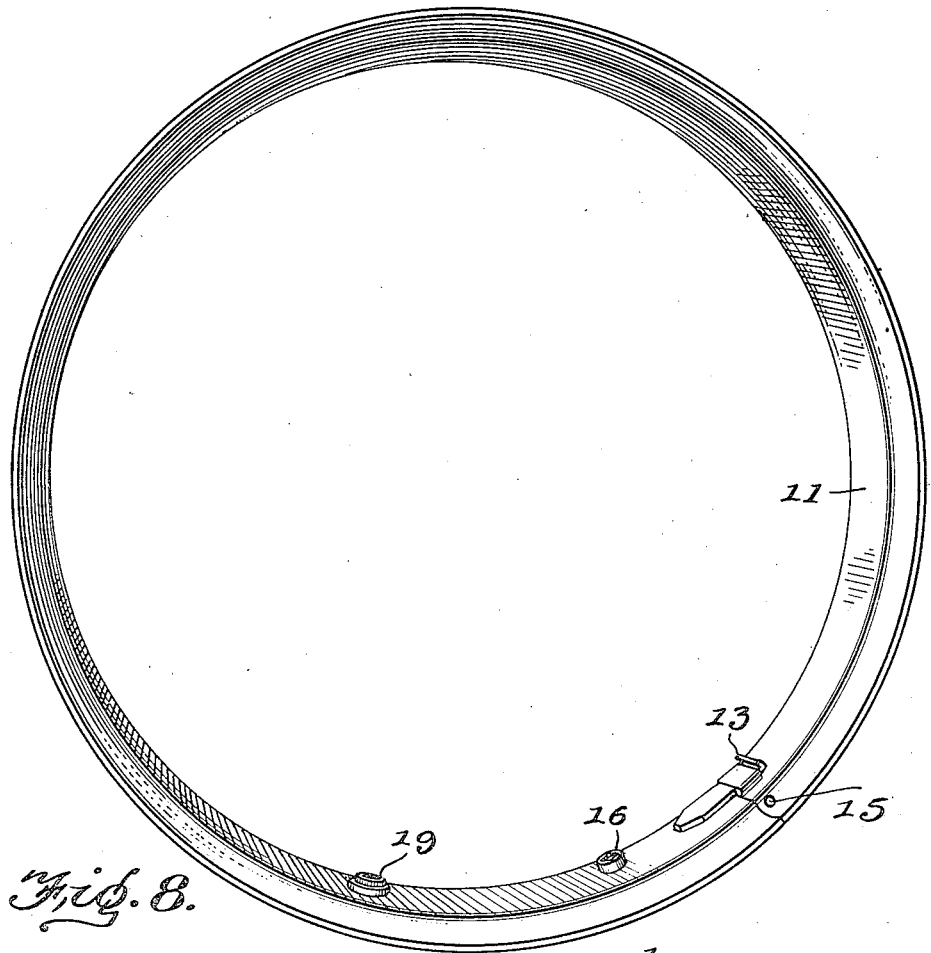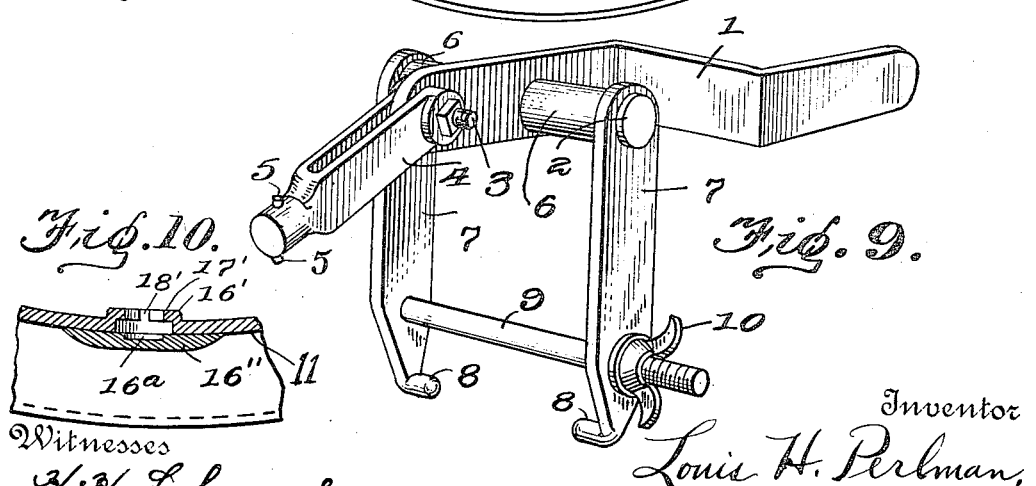

UNITED STATES PATENT OFFICE.

LOUIS H. PERLMAN, OF NEW YORK, N. Y.

RIM-OPERATING TOOL.

1,374,102.　　　　　Specification of Letters Patent.　　Patented Apr. 5, 1921.

Application filed December 4, 1916. Serial No. 135,071.

*To all whom it may concern:*

Be it known that I, LOUIS H. PERLMAN, a citizen of the United States, residing at New York city, in the county of New York and State of New York, have invented certain new and useful Improvements in Rim-Operating Tools; and I do hereby declare the following to be a full, clear, and exact description of the invention, such as will enable others skilled in the art to which it appertains to make and use the same.

This invention relates to improvements in tools for operating demountable rims of automobile wheels, and more particularly to such tools as are adapted for manipulating a cross cut demountable rim during the operation of removing and replacing a tire on such a rim.

The object in view is the provision of means for facilitating manual manipulation of a rim for expediting and reducing the labor of mounting a tire on a cross cut demountable rim and removing a tire therefrom.

With this and further objects in view as will in part hereinafter become apparent and in part be stated, the invention comprises certain novel constructions, combinations and arrangements of parts as subsequently specified and claimed.

In the accompanying drawing,—

Figure 1 is a view in side elevation of a tool embodying the features of the present invention and shown as applied and in its position just prior to the beginning of an operation of manipulating a rim.

Fig. 2 is a sectional elevation thereof, the tool having been moved to the rim collapsing position.

Fig. 3 is a plan view of the parts seen in Fig. 1.

Fig. 4 is a detail plan view of the tool receiving socket, a fragment of the rim being shown.

Fig. 5 is a vertical section taken approximately on the plane indicated by line 5—5 of Fig. 1.

Fig. 6 is a transverse section taken on the planes indicated by line 6—6 of Fig. 1, the parts being seen in elevation.

Fig. 7 is a similar view taken on the plane indicated by line 7—7 of Fig. 1.

Fig. 8 is a perspective view of a rim adapted for receiving the tool.

Fig. 9 is a perspective view of the tool detached with the extension handle omitted.

Fig. 10 is a fragmentary, enlarged, detail section taken through a modified form of tool receiving socket of the rim.

Referring to the drawing by numerals, 1 indicates an operating lever which is pivoted on a shaft 2 and has one of its ends fulcrumed on pivot 3 carried by a bifurcated bar or fulcrum post 4. The free end of the post 4 is formed cylindrical and provided with diametrically opposite outstanding locking pins 5. The shaft 2 is surrounded by sleeves 6, 6, arranged at opposite sides of the lever 1 and serving as spacers therefor. The shaft 2 is provided with heads at its ends, and between the heads of the shaft and the outer ends of the sleeves 6 are arranged links 7, 7, the links being pivoted onto the shaft in a position to swing freely thereon. The free end of each link is bent substantially at right angles and is preferably tapered to form a hook 8. Each hook 8 is relatively straight but as will become apparent serves the purpose of an ordinary hook. The links 7 are connected near their free ends by a cross rod 9 having a head at one end engaging one of the links and a nut 10 threaded onto the opposite end portion and engaging the other link. An appropriate washer may be employed between the nut and link as also between the head of rod 9 and the adjacent link.

The tool is adapted for use in conjunction with a cross cut demountable rim, such as seen at 11 in the drawing. Rim 11 is provided with a tongue 12 outstanding from one end and formed with a hook 13 adapted to enter a slot 14 formed in the opposite end of rim 11 for receiving said hook. The flanges of rim 11 at the slotted end are formed with apertures 15 for receiving the hooks 8 of link 7. The opposite end portion of the rim 11 is provided with a radially-inwardly extending projection or stud 16 which is riveted or otherwise fixed to the rim. The stud 16 is formed with an axial recess overhung by a substantially annular flange 17, the flange being interrupted at diametrically opposite points by radial openings or slots 18. The slots 18 are disposed to be intersected by a line extending transversely of the rim and are of a size adapted to permit the passage of the pins 5, the recess in the stud 16 being proportioned to receive the cylindrical lower end portion of the post 4.

In operation, the rim 11 being in the non-collapsed condition seen in Fig. 1, the cylindrical portion of post 4 is introduced into the recess in stud 16 while the lever 1 is disposed to extend in a direction transversely of the rim, as indicated in dotted lines in Fig. 3. The pins 5 are passed through the slots 18 and then the lever 1 is swung to a position substantially alined with the rim, during which movement the pins 5 are moved beneath the overhanging flange 17. Thus the post 4 is quickly and effectively anchored to the rim. The links then are caused to engage the opposite end portion of the rim by having the hooks 8 inserted in the apertures 15 and the nut 10 threaded up sufficiently for tightening the links in the given position.

The lever 1 is offset at 20 and provided with a terminal portion 21 adapted to receive a complemental operating tool 22 of any appropriate length, the tool or handle 22 being formed with a socket to snugly receive the portion 21. The offset 20 enables the handle 22 to lie outside the planes of the rim 11, and offset 20 is preferably of sufficient length to leave the handle 22 entirely free of the adjacent edge of the rim so as to facilitate manual manipulation.

The parts being assembled as above described and as seen in Fig. 1, the operator grasping the lever 22 swings the same through an arc of approximately 220 degrees. The effect of this movement is to cause the links 7 to travel through such a path as effects first a movement of that end of rim 11 engaged by the links inward to an extent freeing the end from engagement with hook 13, and then to move toward the bar 4 until the end portions of the rim are in the lapping position seen in Fig. 2. This movement brings the pivots for links 7 represented by rod 2 below the plane of the pivot 3 and at the opposite side from the position formerly occupied so that the pull of the rim ends incident to the tendency of the rim 11 to assume its former condition is effectively resisted and the parts are locked in their collapsed condition. This collapsing movement results in a reduction in the effective diameter of the rim 11 so that a tire with inextensible marginal beads may be applied or removed without difficulty. The handle 22 is preferably withdrawn from its engagement with the lever during the application or removal of a tire to or from the rim 11. After a tire is removed and a new tire applied, the rim 11 is expanded to its normal position merely by re-application of the handle 22 to lever 21 and a converse movement of the parts from that producing the collapsed condition of the rim 11. Repeated tests have effectively established the fact that this converse movement not only returns the rim ends to their former relative positions, but automatically applies the slot 14 over the hook 13, and thus restores the locked-together condition of the rim ends as it existed prior to the collapsing of the rim by the instrumentalities described.

It should be apparent, of course, that the pins 5 and coöperating slots are the equivalent of threads and any other form of threads or other appropriate connecting means may be utilized, but it is especially desirable that the locking of the post 4 to the stud 16 shall be accomplished quickly and effectively so as to prevent loss of time and obviate possibility of accidental disengagement. The cylindrical portion of the post 4 is proportioned to fit snugly in the socket or bore of the stud 16 so that the post 4 may serve as a fulcrum post and without liability of objectionable looseness or play.

The projecting tongue 12 may be formed in any appropriate manner, the said tongue being produced in the structure shown in the drawing by the provision of a separate plate welded or otherwise appropriately anchored to the web of the rim 1. Other shapes of tongues and other methods of connection therefor may be provided as may be desired.

It is to be noted that the rim 11 is provided with a valve stem hole at 19 surrounded by the usual driving stud, the hole 19 being located in that end portion of the rim 11 which carries the socket provided by stud 16. An important advantage of this arrangement arises from the fact that the distortion of the rim when being collapsed occurs along that end portion which is provided with the apertures 15, and the end portion carrying stud 16 is not relatively distorted whereby the valve stem extending through the hole 19 is not subjected to the strain of the shifting of a portion of the rim. In other words, the end portion of rim 11 which is provided with apertures 15 is actually swung inward with the movement of the tool as described, and if the valve stem hole 19 were provided in that portion of the rim which is thus swung, there would be a tendency both to bend the valve stem out of place and to strip material off of the stem incident to movement of the rim end portion independent of the tire mounted thereon.

While the stud 16 which provides the post receiving socket has been shown as one effective means of receiving the post 4, other forms of sockets may be employed, as for example such as is seen in Fig. 10 wherein the material of the rim 11 is stamped to form a stud 16' having the socket or bore provided with the overhanging flange 17' and the slots 18' for admitting the pins 5 of the post. When the stud is formed in the manner seen at 16' the socket would open through the rim if not covered, and, therefore, a cover plate 16" is provided and fixed to the outer face of the web of the rim as by riveting, welding or the like, and is provided preferably with a recess 16ª for snugly receiving the extreme end portion of the post 4.

What I claim is:—

1. In an operating tool for manipulating a cross-cut demountable rim, a fulcrum post comprising a bar having a pivot-receiving end, and a rim-engaging end, the rim-engaging end being dimensioned and shaped to fit detachably within a locking socket, and means at the rim-engaging end for detachably and rigidly locking said end in a socket.

2. In an operating tool for manipulating a cross-cut demountable rim, a fulcrum post comprising a bar having a pivot-receiving end and a rim-engaging end, the rim-engaging end being dimensioned and shaped to fit detachably within a locking socket, and a laterally extending projection at the rim-engaging end for detachably and rigidly locking said end in a socket.

3. An operating tool for manipulating a cross-cut demountable rim comprising a lever, a fulcrum bar pivoted thereto and shaped to fit within a socket on a rim for detachably and rigidly engaging the rim, and a link pivoted to the lever and having means of engagement with a rim.

4. In an operating tool for manipulating a cross-cut demountable rim, a fulcrum post comprising a bar having a pivot-receiving end and a rim-engaging end, the rim-engaging end being dimensioned and shaped to fit detachably within a locking socket, and diametrically opposite projections at the rim-engaging end for detachably and rigidly locking said end in a socket.

5. An operating tool for manipulating a cross-cut demountable rim comprising a lever, a fulcrum post pivoted thereto and adapted to detachably but rigidly engage a rim, said post and lever being proportioned and adapted to operate effectively when the post engages a rim directly in the median line thereof and a link also pivoted to the lever and having means of direct engagement with the rim.

In testimony whereof I affix my signature in presence of two witnesses.

LOUIS H. PERLMAN.

Witnesses:
 I. B. LEIBSON,
 EMMA M. FRÜHLING.